United States Patent [19]

Pitts et al.

[11] Patent Number: 4,668,124

[45] Date of Patent: May 26, 1987

[54] DISPOSAL OF MATERIAL CONTAINING VANADIUM AS LANDFILL

[75] Inventors: Frank Pitts, Magalas, France; Glen A. Hemstock, Princeton; Inez L. Moselle, Metuchen, both of N.J.

[73] Assignee: Engelhard Corporation, Menlo Park, N.J.

[21] Appl. No.: 725,878

[22] Filed: Apr. 22, 1985

[51] Int. Cl.$^4$ .............................................. B09B 3/00
[52] U.S. Cl. .................................. 405/129; 106/109; 106/120; 210/751; 210/901; 423/65
[58] Field of Search ................. 106/85, 109, 117, 118, 106/120; 208/13, 251 R; 210/710, 719, 724, 726, 751, 912, 901; 405/129, 263, 266; 423/65–67, 140, 147; 502/521

[56] References Cited

U.S. PATENT DOCUMENTS

| 3,752,759 | 8/1973 | Burg | 210/719 |
| 3,904,498 | 9/1975 | Hesse et al. | 208/13 |
| 3,984,312 | 10/1976 | Dulin et al. | 210/751 |
| 4,116,705 | 9/1978 | Chappell | 210/751 |
| 4,263,128 | 4/1981 | Bartholic | 208/93 |
| 4,268,188 | 5/1981 | Bertus et al. | 210/901 |
| 4,350,598 | 9/1982 | Bolsing | 208/13 |
| 4,404,105 | 9/1983 | de'Lockerente et al. | 210/751 |
| 4,432,666 | 2/1984 | Frey et al. | 210/751 |

FOREIGN PATENT DOCUMENTS

| 52-42470 | 4/1977 | Japan | 210/912 |
| 56-149316 | 11/1981 | Japan | 423/65 |
| 59-10389 | 1/1984 | Japan | 210/724 |

Primary Examiner—Peter Hruskoci
Attorney, Agent, or Firm—Inez L. Moselle

[57] ABSTRACT

Materials containing vanadium values which are leachable by water are treated to reduce the leachability of vanadium to minimum practical values, thereby rendering the material suitable for disposal as landfill. Vanadium is insolubilized by adding a polyvalent metal salt which is capable of dissolving in water to form an acidic solution from which polyvalent metal cations are precipitated at a pH of 5, the polyvalent cations having a valence of +3 or higher or being a divalent metal that is oxidizable to a valence of +3 or higher. The salt-treated mixture is then neutralized by a base. The vanadium may be contained in a solid such as, for example, a spent cracking catalyst or a spent sorbent used in the upgrading of petroleum feedstock by selective vaporization or it may be contained in liquid material.

30 Claims, No Drawings

DISPOSAL OF MATERIAL CONTAINING VANADIUM AS LANDFILL

BACKGROUND OF THE INVENTION

This invention relates to disposing metal contaminated material containing soluble vanadium as landfill. Examples of such vanadium contaminated materials are spent cracking catalysts and spent contact material used in a selective vaporization process for upgrading heavy petroleum crudes, resid fractions of petroleum crudes or the like.

The Asphalt Residual Treating (ART sm) Process is a decarbonizing and demetallization process that has been developed to treat residual stocks and heavy crudes for the removal of contaminants. The process is described in numerous publications, including "The ART Process Offers Increased Refinery Flexibility", R. P. Haseltine et al, presented at the 1983 NPRA Conference in San Francisco. See also U.S. Pat. No. 4,263,128 to Bartholic. The process is a non-catalytic technological innovation in contaminant removal and will typically remove over 95% of the metals, essentially all the asphaltenes and 30% to 50% of the sulfur and nitrogen from residual oil while preserving the hydrogen content of the feedstock. The process enables the subsequent conversion step in residual oil processing to be accomplished in conventional downstream catalytic processing units.

The ART Process utilizes a fluidizable solid particulate contact material which selectively vaporizes the valuable, lower molecular weight and high hydrogen content components of the feed. The contact material is substantially catalytically inert and little if any catalytic cracking occurs when the process is carried out under selected conditions of temperature, time and partial pressure. Generally, suitable contact material has a relatively low surface area, e.g., 5 to 20 $m^2/g$ as measured by the BET method using nitrogen. Presently preferred contact materials are silica-aluminas produced by calcining microspheres containing kaolin clay. Heavy metals are deposited on the contact material and removed. High molecular weight asphaltenes also deposit on the contact material, some asphaltenes being converted to lighter product. Because the contact material is essentilly catalytically inert, very little molecular conversion of the light gas oil and lighter fractions takes place. Therefore the hydrogen content of these streams is preserved. In other words, the lighter compounds are selectively vaporized. It is believed that the molecular conversion which does take place is due to the disproportionation of the heavier, thermo-unstable compounds present in the residual feedstock.

The hydrogen content of the coke deposited on the contact material is typically less than four percent. Coke production is optimally equivalent to 80% of the feedstock Conradson Carbon Residue content. Heat from the combustion of coke is used internally within the ART system. Surplus heat may be recovered as steam or electric power. No coke product is produced.

The ART Process is adapted to be carried out in a continuous heat-balanced manner in a unit consisting primarily of a contactor, a burner and an inventory of recirculating contact material. Chargestock is contacted with particles of hot fluidizable contact material for a short residence time in the contactor. In the contactor, the lighter components of the feed are vaporized; asphaltenes and the high molecular weight compounds, which contain metals, sulfur and nitrogen contaminants, are deposited on the particles of the contact material. The metals invariably include vanadium and nickel. Some of the asphaltenes and high molecular weight compounds are thermally cracked to yield lighter compounds and coke. The metals that are present, as well as some of the sulfur and nitrogen bound in the unvaporized compounds, are retained on particles of contact material. At the exit of the contacting zone, the oil vapors are rapidly separated from the contact material and then immediately quenched to minimize incipient thermal cracking of the products. The particles of contact material, which now contain deposits of metals, sulfur, nitrogen, and carbonaceous material are transferred to the burner where combustible contaminants are oxidized and removed. Regenerated contact material, bearing metals but minimal coke, exits the burner and circulates to the contactor for further removal of contaminants from the chargestock.

In practice, the metals level of contact material in the system is controlled by the addition of fresh contact material and the withdrawal of spent contact material from the burning zone.

Generally, metals accumulated on the contact material used in the ART Process tend to be less active in forming coke than metals accumulated on cracking catalyst. Thus, the ART Process is able to operate effectively when accumulated metals are present on the contact material at levels higher than those which are generally tolerable in the operation of FCC units. For example, the process has operated effectively when combined nickel and vanadium content substantially exceeded 2% based on the weight of the calcined kaolin clay contact material.

The oxidation state of vanadium in the withdrawn particles will depend upon the conditions used in the burning zone. Typically, the vanadium is present in both $V^{+5}$ and $V^{+4}$ oxidation states even when the burner is operated with an excess of oxygen. A portion of the contact material with accumulated deposit may also be discharged with combustion gases and/or vaporized hydrocarbon product in the form of fines, i.e., particles not retained by cyclone separators in the contactor and/or burner zones.

In prior commercial practice, the spent contact material has been discarded without removing metals. It has been proposed to leach spent contact material to remove at least part of the metal contaminants before recycling the contact material to the system. This can result in a by-product solution containing nickel and vanadium. Under some conditions it may be desirable simply to dispose of the resulting leachate without recovering all of the metal values or without removing any metals.

Similarly, particles of spent fluid cracking catalysts will contain deposits of metal contaminants originating in the petroleum feedstock charged to the fluid catalytic cracking (FCC) unit. Spent catalyst particles are periodically withdrawn from the FCC regenerator in order to permit catalytic cracking units to operate at desirable activity and selectivity levels. See, for example, U.S. Pat. No. 4,268,188. The spent catalyst is frequently employed to start-up FCC units. Usually spent cracking catalyst particles, as well as fines discharged from FCC regenerators, are discarded and used as landfill. There has been a trend in recent years to charge FCC units with feedstocks which contain considerably higher levels of metal contaminants than the relatively "clean" gas oils heretofore used as FCC chargestock. Consequently, spent FCC catalysts may be expected to contain higher metals concentrations than were encountered in the past unless high catalyst replacement rates are used.

When discarded materials or leachates are to be disposed of as landfill, it is desirable to minimize leaching of water soluble heavy metals contaminants. Such materials are likely to come into prolonged contact with rain and/or surface waters, resulting in possible pollution of the waters. Generally, such waters are mildly acidic, e.g., the pH is about 3–5. Further, it is desirable to accomplish this result while minimizing treatment costs associated with chemical additives and equipment. Also, it is advantageous to provide material intended for disposal as landfill in the form of a solid or semi-solid mass amenable to direct disposal without a downstream filtration or dewatering step.

In addition to vanadium and nickel, metals originating in petroleum feedstocks may include one or more of the following as contaminants: chromium, cobalt, copper, arsenic, antimony, bismuth and barium. When present, these metals eventually form a deposit on spent cracking catalyst or spent contact material used in an ART unit. Constituents present in spent material that are leachable in water typically include $V^{+5}$ and $V^{+4}$ compounds. In some cases, nickel is also leachable. Generally, the leachates are mildly acidic, e.g., pH is 3 to 6. Thus, when such materials are disposed of as landfill, leaching of vanadium or vanadium and nickel is likely to occur. Processes capable of insolubilizing vanadium should also result in treated products in which leaching of the aforementioned other metals is minimal.

The difficulty involved in insolubilizing vanadium in spent contact material or cracking catalysts is that vanadium, an amphoteric element, is soluble at acidic pH values and is still somewhat soluble at neutral and mildly alkaline pH values at which other heavy metals such a nickel and iron are insoluble or are low in solubility. Vanadium compounds increase in solubility at strongly alkaline pH values.

Similar problems in insolubilizing vanadium while assuring limited solubility of other metals may be encountered in the disposal of vanadiferous solutions or slurries which contain vanadium in mixture with other heavy metals. Such solutions or slurries may result from treatment of used catalysts or contact materials or in disposing of ores, ore tailings or ore concentrates.

The present invention solves the problem of reducing the leachability of normally leachable vanadium compounds to minimum practical levels by addition of certain polyvalent ions which result in the conversion of the vanadium values of compounds that are insoluble at moderately acidic pH values, e.g., pH 5, at which other heavy metals are insoluble or substantially so.

SUMMARY OF THE INVENTION

Prior to disposing of material comprising one or more water-soluble vanadiferous compounds as landfill, the leachability of the vanadium is reduced, preferably to minimum practical levels, by contacting the vanadiferous material in the presence of water with one or more of water soluble acidic salts of certain polyvalent metals, hereinafter described. The resulting mixture is then neutralized with a base. The polyvalent salt (or salts) is preferably present in amount at least sufficient to provide at least one equivalent of cation in the salt per equivalent of leachable vanadium. A feature of the invention is that contaminant metals associated with vanadium, for example nickel, also have very limited solubility after undergoing the treatment.

Polyvalent metal salts useful in practice of the invention are those that are capable of dissolving in water to form an acidic solution and which are capable of forming hydroxides, oxides or hydrated oxides which are substantially insoluble at pH 5, said polyvalent metal having a valence of $+3$ or higher or being a divalent metal that is oxidizable to a valence of $+3$ or higher. Metal sulfate, chloride and nitrate salts selected from the following divalent and trivalent metal cations are suitable: $Fe^{+2}$; $Fe^{+3}$; $Mn^{+2}$, $Mn^{+3}$, $Zr^{+4}$, $Ti^{+4}$, $Al^{+3}$ and trivalent or quadrivalent rare earth or mixtures of rare earths.

An advantageous feature of the process is that the weight added to the material as a result of the insolubilization treatment may be minimal because relatively small amounts of chemical additives and water are needed. Most preferably, a minimum amount of water is introduced during the treatment and a solid or semi-solid mass, essentially free from solubles, is provided. Such material is amenable to direct disposal as landfill without further treatment. In the treatment of a typical solid residue, the weight of the treated product is only about 1½ times the weight of the material being processed. Another advantage is that it is not necessary to add heat during treatment. It will be noted, however, the mixture undergoess an increase in temperature which may be significant during the neutralization step which is exothermic.

Another advantage of the process is that the salt can be added in excess, even substantial excess, because excess salt will be neutralized during the second phase of treatment.

Most preferably, the anion of the metal salt is a sulfate and neutralization is carried out entirely with a calcium-containing base such as lime. By using such combinations of reagents, insoluble calcium sulfate is a reaction product, and no soluble or potentially soluble chemicals are introduced during the treatment.

While anions other than sulfate can be present in the salt reagent, it is obvious that sulfite and formate salts, for example, would produce undesirable discharges into streams. For this reason, reducing anions such as nitrites may be undesirable. Other anions also undesirable for discharge into streams include halides, fluoborates and fluosilicates. Also, many organic materials such as citrates and acetates, which promote biological action in water, may be undesirable.

It is not presently understood how the presence of polyvalent metal salt contributes to the insolubilization of vanadium but it is believed that the anion of the salt does not play a role other than providing the polyvalent metal cations in initially soluble forms.

DETAILED DESCRIPTION OF PREFERRED EMBODIMENT

The present invention in especially preferred aspects is a simple and economical procedure for treatment of spent ART Process fluidizable contact material or spent fluid cracking catalyst to render such materials suitable for direct disposal without the need for prior extraction of metals. The ART Process is described in U.S. Pat. No. 4,263,128 to Bartholic, the disclosure of which is incorporated herein by cross-reference thereto. A presently preferred contact material is a catalytic inert solid obtained by spray drying an aqueous slurry of kaolin clay and calcining the resulting microspheres to cause the kaolin clay to dehydrate and pass through the characteristic exothermic reaction. Present day fluid cracking catalysts contain a zeolitic molecular sieve component and a matrix-diluent which is an inorganic oxide, usually silica-alumina.

The especially preferred treatment of the present invention comprise the steps of:

(a) contacting spent fluidizable contact material or spent cracking catalyst contaminated with metals in the presence of water with:

(i) ferrous sulfate acidified with sulfuric acid or
  (ii) ferrous sulfate alone or
  (iii) ferric sulfate or
  (iv) aluminum sulfate or
  (v) mixtures of aluminum and iron sulfates; and (b) pugging the material treated in step (a) with sufficient calcium hydroxide to raise the pH to at least 7 (or at least 8 when nickel is also present), and, preferably, to at least pH 10.

The amounts of any water added in steps (a) and (b) should be the minimum consistent with adequate wetting of the solids so as to produce a final product of minimum weight for disposal.

Tests were carried out on various samples of spent ART contact material containing vanadium. The fresh contact material had been produced by calcining microspheres of kaolin clay. An amount of ferrous sulfate of 5 parts by weight $FeSO_4.7H_2O$ per 100 parts by weight of the spent contact material adequately suppressed vanadium leach-ability in all samples tested, although smaller additions could be used in some cases. Acidification of the ferrous sulfate appears to be unnecessary, but, where applied (with the intent of reducing any $V^{+5}$ material to less soluble $V^{+4}$ form), the sulphuric acid addition was about 1 part per 100 parts spent material. Final weight for disposal averaged 166% of the weight of spent material treated. Based on a large batch made in a mechanical pug mill, this weight was reduced to 152%. Using unacidifed ferrous sulfate would reduce processing costs by only a small amount due to omission of $H_2SO_4$ and the reduction in the amount of $Ca(OH)_2$ to 1.3 parts per 100 of spent material from 2.3 parts per 100.

It was found that where ferric sulfate was used, the requirements were the same as for ferrous sulfate (5 parts per 100 parts by weight of contact material) when using $Fe_2(SO_4)_3xH_2O$, containing 72% $Fe_2(SO_4)_3$ (which is the same for the laboratory grade as for the commercial grade). It may be noted that this material has the same Fe content (about 20%) as $FeSO_4.7H_2O$. Lime requirements were the same as for acidified ferrous sulfate as was the final weight of disposal material.

When 5 parts by weight per 100 parts by weight of either ferrous or ferric sulfate were used, there was found to be a reduction in leachability of nickel from those samples which, without prior treatment, showed higher leachability of nickel (2.6 to 4 ppm). Nickel leach levels were reduced to 2 ppm or less.

Ferric chloride/lime has been shown to be as effective as ferric or ferrous sulfate. Lime and salt costs would be about the same, but with the disadvantage of generating a calcium chloride waste stream. However, this finding demonstrates that the sulfate ion is not an essential ingredient in the insolubilization of vanadium.

Aluminum sulfate has been shown to be effective at about the same addition levels as ferrous or ferric sulfate and with about the same lime requirements and final weight generation, so that costs would be substantially equal to those for the iron systems. There is an indication that vanadium leach levels may be reduced by incorporation of a small proportion of ferric sulfate along with aluminum sulfate and that, with or without ferric sulfate, the alum system may give reduced nickel leaching. However, these findings are based on only one sample of spent contact material.

The use of lime alone, in the absence of an inadequate amount of soluble polyvalent metal such as iron and aluminum, has been found to be ineffective in suppressing leaching of vanadium.

The following examples are given for illustrative purposes and are not to be construed as limiting the invention unless otherwise indicated.

In illustrative examples, the terms "KNV" and "CAL" refer to samples of spent contact material removed from the burners of two different ART units. The letter following the term "KNV" or "CAL" refers to specific batches of spent contact material. For example, KNV/A and KNV/E refer to different samples of spent material from the same unit but obtained at different times and, therefore, having different compositions reflecting differences in feedstock to the ART units, different temperatures in the ART burner, as well as different metal levels. The fresh contact materials (material charged to the ART units) were composed of calcined kaolin clay and were obtained by the procedures described in U.S. Pat. No. 4,263,128. More specifically, deflocculated aqueous slurries of high purity Georgia Kaolin clay were spray dried in commercial spray dryers and the resulting microsphere classified to obtain fluidizable particles and then calcined at a temperature and time sufficient to undergo the characteristics kaolin exotherm without substantial formation of mullite.

These examples refer to an "EPA" leach test. The Environmental Protection Agency (EPA) has provided a procedure to extract solid waste with water to determine whether toxic substances can enter ground water that is used as drinking water. This extraction procedure hereinafter has been published in the Federal Register, Vol. 43, No. 243, pp. 58956–7 (Monday, Dec. 18, 1978). By this procedure, determination of leachability is determined at pH $5.0\pm0.2$, using 0.5N acetic acid to adjust pH. The E.P.A. leach test requires that the sample leached should be at least 100 grams. Since the material used in some of the examples was of particle size less than 100 microns it was considered justifiable to use substantially smaller sample weights. These are recorded in the examples and where weights of less than 100 grams were used the ratio of sample weight to weight of leach water used was always the same as that required in the E.P.A. test. To verify the validity of leach tests based on less than 100 grams sample weight, a disposable material was prepared by treatment of a sample of spent ART contact material KNV/M) with acidified ferrous sulphate followed by lime neutralization, and three samples were leached by the E.P.A. test method except that sample weights of 20,50 and 100 grams were used, respectively. In carrying out the tests, 150 g KNV/M was mixed with 3.0 g $FeSO_4.7H_2O$ and 5.58 g 10% $H_2SO_4$ dissolved in water. A total of 70 ml $H_2O$ was added to make a mixable paste. $Ca(OH)_2$ was added in amount of 1.71 g, resulting in a pH of 11.7. The weight of the treated sample of KNV/M was 230.3 g. Samples of the treated material were then subjected to the E.P.A. leach test. From the data, shown below, it was concluded that the V and Ni contents of the leachates were independent of the sample weight within the range of 20 g to 100 g.

| Sample Weight | E. P. A. Leachates (ppm) | |
|---|---|---|
| g | V | Ni |
| 20 | 30 | 1.7 |
| 50 | 32 | 1.5 |
| 100 | 31 | 1.7 |

Other methods to test leachability of the material treated by the process of the invention can be selected by one skilled in the art. Generally, such methods should result in determinations of leachability at pH 5.0. It is necessary to ensure compliance with whatever law, local or other, which may be applicable to the presence of the contaminants and/or the substances used in the process of the invention. We believe that leachable vanadium in material used as landfill should be less than 10 ppm, preferably 5 ppm or below, as determined by the E.P.A. test published in Vol. 43 of the Federal Register. However, we are not aware of federal regulations that are applicable to vanadium or nickel.

In all the examples, analyses of Ni and V in spent contact materials were made by fusion with sodium carbonate and sodium tetraborate and dissolution in hydrochloric acid, the metals being then determined by atomic absorption spectrometry. All analyses of metals in leachates were carried out by atomic absorption spectrometry.

Where values are below atomic absorption detection limits, they are:
V < 1 ppm
Ni < 0.3 ppm
Values reported are considered accurate to:
V up to 10 ppm ± 1 ppm
above 10 ppm ± 10% of value reported
Ni up to 5 ppm ± 0.3 ppm
above 5 ppm ± 10% of value reported In carrying out the tests described in these examples, it was desired to reduce leachability of vanadium to 10 ppm or below, preferably below 3 ppm.

Figures given in the examples for "E.M.F." indicate the E.M.F. as measured between platinum and silver/silver chloride electrodes. A value of about −400 mv. indicates that all the vanadium is tetravalent and iron is divalent. When all the vanadium is pentavalent, the E.M.F. is about −900 mv. Intermediate values indicate mixtures of valence states.

EXAMPLE I

This example, in conjunction with subsequent examples, demonstrates the necessity of adding a polyvalent metal to spent contact material in order to minimize the leachability of vanadium.

A. Treatment of Spent ART Process Material with $Ca(OH)_2$ Only

One hundred (100) g of KNV/E (V—1.94%, Ni, 0.38%) were pugged with 50 g $H_2O$, giving a pH of 6.2. Ten (10) g $Ca(OH)_2$ and 10 g $H_2O$ were pugged in to give a paste of pH 12.3. An E.P.A. leach test gave: V—250 ppm, Ni—3.6 ppm, indicating that lime alone was ineffective in suppressing leaching of vanadium.

B. Treatment with $Ca(OH)_2$ Alone After Acidifying with $H_2SO_4$

Fifty (50) g of KNV/M (V—1.73%, Ni—0.41%) were pugged with 25 g $H_2O$ giving pH 6.2. Addition of 2.68 g 20% $H_2SO_4$ reduced the pH to 1.5. Addition of 1.2 g $Ca(OH)_2$ raised the pH to 11.8.

An E.P.A. leach test gave: V—100 ppm, Ni—3 ppm, indicating that acidification (without introduction of polyvalent cations) plus lime treatment was ineffective in suppressing leaching of vanadium.

A similcar experiment using KNV/PD 1 (V—0.85%, Ni—0.22%) gave the following leach values: V—55 ppm, Ni<0.3 ppm.

EXAMPLE II

Various spent ART Process materials were pugged with solutions of acidified ferrous sulfate and then neutralized with lime. Details and results appear in Table I.

EXAMPLE III

The procedures of Example II were repeated using lower levels of ferrous sulfate than in Example II. Detailed and results appear in Table 2.

EXAMPLE IV

Procedures of Examples II and III were repeated to optimize proportions of reagents. Details and results are reported in Table 3.

EXAMPLE V

A. Ferric sulfate was used instead of ferrous sulfate in experiments similar to those described in previous examples. See Tables 4 and 5.

B. Ferric chloride was used in similar tests. Fifty (50) g KNV/PD-1 (V—0.85%, Ni—0.22%) were pugged with 1 g $FeCl_3.6H_2O$ dissolved in 25 g $H_2O$ and a further 8.5 g $H_2O$ added (pH 1.5, EMF 700 mv); 0.87 g $Ca(OH)_2$ was added to pH 10.5. Weight of the resulting paste was 85.4 g. The amount of $FeCl_3$ used was of Fe content equal to that of 1 g of $Fe_2(SO_4)_3.XH_2O$.

An E.P.A. leach test gave: V—2 ppm, Ni<0.3 ppm, indicating that ferric chloride was effective.

EXAMPLE VI

Spent ART Process contact material was rendered amenable to disposal as landfill by addition of aluminum sulfate and lime or mixtures of aluminum and ferric sulfate and lime. See Table 6. It should be noted that when aluminum salts other than the sulfate are used in practicing the invention that pH should be in the range of 8 to 10 after neutralization in order to avoid solubilization of aluminum which may occur at pH above 10, e.g., pH 12.

EXAMPLE VII

Spent ART process contact material was rendered amenable to disposal by addition of mixed rare earth chlorides and lime. Fifty (50) g of spent contact material CAL-#5 (V 0.98%, Ni 0.39%) were mixed with 6 g of a solution of rare earth chlorides and 26.7 g of $H_2O$. The solution of mixed rare earth chlorides contained 23.1% total rare earths having the following composition (calculated as oxides):

|       | $CeO_2$ | $Sm_2O_3$ | $La_2O_3$ | $Y_2O_3$ | $Nd_2O_3$ | $Pr_6O_{11}$ |
|-------|---------|-----------|-----------|----------|-----------|--------------|
| wt. % | 3.67    | 0.11      | 12.84     | <0.01    | 4.70      | 1.77         |

$Ca(OH)_2$ was then added to pH 10.0 (0.96 g added and 2.3 g $H_2O$).

The total paste (86.0 g) was leached at pH 5.0±0.2 according to the E.P.A. test method. The leachate contained <1 ppm V, and 1 ppm Ni, indicating that rare earth chlorides are an effective treatment agent.

EXAMPLE VIII

This example is similar to the previous example except that ceric sulfate was used instead of mixed rare earth chlorides. Fifty (50) g CAL-#5 were mixed with a solution of 2.0 g $Ce(SO_4)_2$ and 2.0 g 20% $H_2SO_4$ diluted with 25 ml $H_2O$. 1.45 g $Ca(OH)_2$ was added to raise the pH to 10.7, an additional 2.6 g $H_2O$ being added. The total paste (83.1 g) was leached by the E.P.A. method. The leachate contained <1 ppm V, 2 ppm Ni, showing that ceric (Ce+4) sulfate is as effective as the mixed trivalent rare earth chlorides.

EXAMPLE IX

Experiments were carried out to determine which metal salts other than those of Fe and Al and rare earth could be used to treat spent ART contact material followed by lime neutralization. The results are reported in Table 7.

The results shown in Table 7 indicate that salts of quadravalent tin, titanium and zirconium may be used in place of iron or aluminum salts or rare earth salts and are equally effective. Stannous chloride ($Sn^{+2}$) was also effective but would have been oxidized to $Sn^{+4}$ by $V^{+5}$. Salts of divalent metals not oxidizable and shown to be ineffective are Zn, Sr, Ca and Mg. Divalent metals which were effective in suppressing leachability of vanadium are Cu and Ni; however, these salts led to high concentrations of Cu and Ni, respectively, in the leachate. Nickel ($Ni^{+2}$) can be oxidized to $Ni^{+3}$ and copper might be converted by $V^{+5}$ to $CuO_2$ ($Cu^{+4}$). $Mn^{+2}$ effect some reduction of leachability of vanadium but gave a high Mn content in the leachate; oxidation of $Mn^{+2}$ to $Mn^{+3}$ or $Mn^{+4}$ is possible.

EXAMPLE X

Another experiment was made to establish that the neutralization could be partially effective with $CaCO_3$ to pH of 5 to 6 followed by completion of neutralization with $Ca(OH)_2$ to pH of about 10. The details of this experiment are as follows:

Twenty five (25.0) g spent contact material CAL-#5 were mixed with 1.25 g $Fe_2(SO_4)_3.xH_2O$ (72% $Fe_2(SO_4)_3$) dissolved in 12.01 g $H_2O$ and 5.7 g $H_2O$ added to produce a stirrable paste; 1.25 g of $CaCO_3$ ("Chemstone" ™ limestone, 90% minus 325 mesh) were added to raise the pH to 5.6 and then 0.26 g $Ca(OH)_2$ were added to pH 10.0, an additional 0.5 g $H_2O$ being added. The total weight of the neutralized paste was 46.0 g.

The leachate from an E.P.A. test on the whole of the paste contained V, <1 ppm and Ni 1 ppm. These results show that neutralization can be partially effected with $CaCO_3$ and completed with $Ca(OH)_2$.

EXAMPLE XI

Tests were carried out to demonstrate the effectiveness of bases other than those containing calcium in the neutralization step.

In each case, 50 g of spent ART Process material (CAL-#5) were mixed with 2.5 g $FeSO_4.7H_2O$ dissolved in 25 g $H_2O$, additional water being added as required. The mixture was nuetralized to pH ≧8 with $Mg(OH)_2$ or NaOH or $Na_2CO_3$. Results are summarized below:

| Neutralizing Reagent Added (g) | | | Additional $H_2O$(g) to | | Final pH | Total wt. of paste g | EPA Leachate (ppm) | |
|---|---|---|---|---|---|---|---|---|
| $Mg(OH)_2$ | NaOH | $Na_2CO_3$ | Acid Mix | Neutralized Mix | | | V | Ni |
| 1.60 | — | — | 2.3 | 3.0 | 8.8 | 84.4 | <1 | 1 |
| — | 0.70 | — | 2.6 | 3.6 | 11.5 | 84.4 | 1 | 1.2 |
| — | — | 1.76 | 3.2 | 2.7 | 9.2 | 85.2 | <1 | 1 |

The results show that bases other than those containing calcium can be used in the neutralization step to minimize leachability of vanadium and nickel. However, soluble salts (magnesium sulfate or sodium sulfate) are produced and may result in leachates undesirable for some disposal situations.

EXAMPLE XII

Tests were carried out to determine the efficiency of the process of the invention in minimizing leachability of vanadium in spent samples of commercial fluid zeolitic cracking catalysts withdrawn from FCC units. Analyses of vanadium and nickel in the equilibrium catalyst samples are given below as are also the results of a direct leach test on each sample.

| Cracking Catalyst Sample No. | Analysis (ppm) | | EPA Leachate (ppm) | |
|---|---|---|---|---|
| | V | Ni | V | Ni |
| A | 3250 | 1700 | 8 | <0.3 |
| B | 4050 | 2000 | 15 | <0.3 |
| C | 3400 | 1700 | 1 | 1 |

In accordance with this invention, 50 g of each of fluid cracking catalysts A & B were mixed with 2.5 g $FeSO_4.7H_2O$ in 25 g $H_2O$ and neutralized with lime to pH ≧10 and leached by the EPA test method. Results are summarized below.

| | $Ca(OH)_2$ Added (g) | Additional $H_2O$ Added (g) | | Total wt. of Paste (g) | pH of Paste | EPA Leachate (ppm) | |
|---|---|---|---|---|---|---|---|
| | | To Acid Mix | To Lime Mix | | | V | Ni |
| A | 0.85 | 10.0 | 2.3 | 90.7 | 12.0 | <1 | <0.3 |
| B | 0.76 | 8.8 | 3.0 | 90.1 | 10.2 | <1 | <0.3 |

Since Sample C contained minimal amounts of leachable vanadium and nickel, the treatment was not used.

EXAMPLE XIII

This example illustrates practice of the invention with liquid solutions. The waste liquor (Solution A) used in this example contained:

| | |
|---|---|
| V | 14.0 gpl |
| Al | 5.82 gpl |
| Ni | 3.55 gpl |
| Fe | 0.24 gpl |
| approx. 30% Free $H_2SO_4$ | | at least 90% of the V in solution A was present as $V^{+5}$.

In a control test, 50 ml of Solution A were stirred at ambient temperature while calcium hydroxide was added until the final pH of the slurry was 11.1; additional water was added to thin the slurry as required. This was filtered and washed. The filtrate and washing contained 54 ppm V and <0.3 ppm Ni. A sample of the moist filter cake was leached at pH 5.0±0.2. The leachate contained 11 ppm V and 37 ppm Ni.

This example was carried out exactly as the control except that 5 g $FeSO_4.7H_2O$ were dissolved in the 50 ml of Solution A before adding calcium hydroxide to a final pH of 11.7. The filter wash contained 1 ppm V and <0.5 ppm Ni indicating that addition of ferrous sulfate was effective in insolubilizing vanadium. The leachate contained 3 ppm V and 22 ppm Ni, showing that leaching of vanadium was reduced by the introduction of ferrous sulfate.

EXAMPLE XIV

Example XIII describes the use of the process to treat a waste liquor containing V and Ni; in the solution at least 90% of the V was present as $V^{+5}$.

A similar solution (Solution B) was made up but with all the V as $V^{+4}$. On neutralizing with lime the filter wash contained 1 ppm V and <0.3 ppm Ni (cf. Example XIII in which the filter wash analyzed V 54 ppm, Ni <0.3 ppm).

An E.P.A. leach of the filter cake gave in the leachate: V 95 ppm, Ni 8 ppm. (cf. Example XIII V 11 ppm, Ni 37 ppm)

In a similar experiment using the same $V^{+4}$ solution, 5 g $FeSO_4.7H_2O$ were added before lime neutralization, as in Example XIII. The filter wash contained 7 ppm V, <0.3 ppm Ni (cf. Example XIII, V 1 ppm, Ni <0.3 ppm). The E.P.A. leachate of the filter cake contained 9 ppm V, 17 ppm Ni (cf. Example XIII, 3 ppm V, 22 ppm Ni).

Another experiment was made with the $V^{+4}$ solution with the addition of 5 g $Fe_2(SO_4)_3 2H_2O$. In this case the filter wash contained 9 ppm V, <0.3 ppm Ni. The E.P.A. leachate contained 4 ppm V, 11 ppm Ni.

It may be concluded that:

1. When V is present a $V^{+5}$, the filter wash from lime neutralization contains much V but when $FeSO_4$ is added before neutralization the filter wash contains no significant V. When V is present as $V^{+4}$ there is no significant V in the filter wash without or with $FeSO_4$. Presumably $V^{+4}$ is much less soluble than $V^{+5}$ at pH about 11.

2. Leaching at pH 5 extracted much more V from the $V^{+4}$ material than from the $V^{+5}$ material, presumably due to greater solubility of the $V^{+4}$ species at this pH.

3. Addition of either ferrous or ferric sulphate is effective in reducing leaching of V to acceptable levels from $V^{+4}$ material. This suggests that conversion of $Fe^{+2}$ to $Fe^{+3}$ by $V^{+5}$ is not a necessary condition, unless in the course of the filtration some $Fe(OH)_2$ became oxidized to $Fe(OH)_3$.

EXAMPLE XIV

Since the nickel levels in the leachates in EXAMPLE XIII were higher than normally encountered when applying the disposal method to ART Process contact materials, it was thought that this might be due to calcium carbonate present in the calcium hydroxide of which a much larger relative proportion was required for the strongly acid waste liquor than for treatment of the only slightly acid contact materials. To test this possibility, Example XIII (including the control) was repeated except that the calcium hydroxide was freshly prepared by calcination of the hydroxide at 1800° F. to remove $CO_2$ and reslaking with water to reconvert to hydroxide free of carbonate. The results were as follows:

| | Analysis of Filter Wash | | Analysis of E.P.A. Leachate | |
|---|---|---|---|---|
| $FeSO_4.7H_2O$ Added | V | Ni | V | Ni |
| None | 11 ppm | <0.3 ppm | 21 ppm | 21 ppm |
| 5.0 g | 1 ppm | <0.3 ppm | 2 ppm | 10 ppm |

The results again show the effectiveness of ferrous sulfate in suppressing leaching of vanadium. They also show that ferrous sulfate promotes a significant reduction in leaching of nickel and that the reduction is greater when calcium hydroxide free of carbonate is used.

Reasonable variation and modification are possible within the scope of the foregoing disclosure and the appended claims to the invention. The term "leachability" as used in the claims refers to such property as determined by the procedure published in the Federal Register, Vol. 43, No. 243.

TABLE 1

TREATMENT OF SPENT ART PROCESS MATERIAL WITH ACIDIFIED FERROUS SULPHATE AND LIME

In each case, 100 g of the spent ART Process material (KNV) were pugged with a solution comprising 12.0 g $FeSO_4.7H_2O$, 5.0 g $H_2SO_4$ and 40.0 g $H_2O$. Then 15.0 g $Ca(OH)_2$ and 30.0 g $H_2O$ were pugged in with addition of water as required.

| Sample No. | KNV USED Analysis V % | Ni % | pH of Acid Mix | E.M.F. of Acid Mix (M.V.) pt-Ag/AgCL Electrodes | Additional $H_2O$ (g) To Acid Mix | To Lime Mix | Final pH | EPA Leachate (ppm) V | Ni |
|---|---|---|---|---|---|---|---|---|---|
| KNV/C | 0.92 | 0.21 | 0.7 | 390 | 17.4 | 13.7 | 12.0 | <1.0 | 0.5 |
| KNV/M | 1.73 | 0.41 | 0.9 | 450 | 5.4 | 14.8 | 12.1 | <1.0 | 2.5 |

TABLE 1-continued
TREATMENT OF SPENT ART PROCESS MATERIAL WITH ACIDIFIED FERROUS SULPHATE AND LIME

| | | | | | | | | | |
|---|---|---|---|---|---|---|---|---|---|
| KNV/O | 0.70 | 0.19 | 0.7 | 380 | 18.5 | 22.3 | 12.1 | <1.0 | 0.6 |
| KNV/PD-1 | 0.85 | 0.22 | 0.7 | 400 | 23.7 | 19.9 | 12.0 | <1.0 | 0.5 |
| CAL-#5 | 0.98 | 0.39 | 0.7 | 400 | 17.6 | 19.1 | 12.0 | <1.0 | 1.3 |

The above leachates were analyzed for 8 EPA specified metals.

| Sample No. | Ag | As | Ba | Cd | Cr | Hg | Pb | Se |
|---|---|---|---|---|---|---|---|---|
| KNV/C | <0.001 | 0.030 | 4.87 | 0.001 | 0.008 | <0.003 | <0.001 | 0.010 |
| KNV/M | <0.001 | 0.034 | 4.86 | 0.001 | 0.008 | <0.003 | 0.001 | 0.010 |
| KNV/O | <0.001 | 0.043 | 4.59 | 0.001 | 0.008 | <0.003 | <0.001 | 0.014 |
| KNV/PD-1 | <0.001 | 0.036 | 4.48 | 0.001 | 0.008 | <0.003 | 0.001 | <0.003 |
| CAL-#5 | <0.001 | 0.044 | 4.55 | 0.001 | 0.008 | <0.003 | 0.003 | 0.013 |

TABLE 2
TREATMENT OF SPENT ART PROCESS MATERIAL WITH ACIDIFIED $FeSO_4$ AND $Ca(OH)_2$

In each case, 50 g of spent material (KNV) was mixed with a solution containing 6.0 g $FeSO_4.7H_2O$, 2.5 $H_2SO_4$ and 20.0 g $H_2O$. The paste was neutralized with 7.5 g $Ca(OH)_2$. Additional $H_2O$ was introduced as necessary to produce a puggable paste.

| Sample No. | KNV USED Analysis V % | KNV USED Analysis Ni % | pH of Acid Mix | E.M.F. of Acid Mix (M.V.) | Additional $H_2O$ (g) To Acid Mix | Additional $H_2O$ (g) To Lime Mix | Final pH | EPA Leachate (ppm) V | EPA Leachate (ppm) Ni |
|---|---|---|---|---|---|---|---|---|---|
| KNV/J | 1.26 | 0.22 | 0.6 | 385 | 1.7 | 7.2 | 12.0 | <1 | 1.0 |
| KNV/H | 1.34 | 0.36 | 0.7 | 400 | 1.8 | 8.8 | 12.1 | <1 | 1.4 |
| KNV/PD.1 | 0.85 | 0.22 | 0.6 | 430 | 11.2 | 7.1 | 12.0 | <1 | <0.3 |
| KNV/F | 1.68 | 0.41 | 0.5 | 400 | 2.1 | 8.1 | 12.2 | <1 | 1.7 |
| KNV/C | 0.92 | 0.21 | 0.7 | 380 | 5.1 | 8.0 | 12.0 | <1 | <0.3 |

TABLE 3
OPTIMIZATION OF $FeSO_4/H_2SO/Ca(OH)_2$ TREATMENT PROCESS

In each case, 50 g of spent ART Process Material (KNV) were treated with various amounts of $FeSO_4.7H_2O$ and $H_2SO_4$ (in the same ratio) and neutralized to pH ≧10 with $Ca(OH)_2$. The whole of the product was submitted to an EPA leach test.

| Sample No. | KNV used Analysis % V | KNV used Analysis % Ni | $FeSO_4.7H_2O$ Added g | $H_2SO_4$ Added g | $H_2O$ Added g | $Ca(OH)_2$ Added g | Additional $H_2O$ g To Acid Mix | Additional $H_2O$ g To Lime Mix | Total Wt. of Paste (g) | EPA Leachate (ppm) V | EPA Leachate (ppm) Ni |
|---|---|---|---|---|---|---|---|---|---|---|---|
| KNV/PD.1 | 0.85 | 0.22 | 2.5 | 0.465 | 22.0 | 1.51 | 9.2 | 3.6 | 89.4 | <1 | <0.3 |
| KNV/PD.1 | 0.85 | 0.22 | 1.0 | 0.186 | 8.0 | 1.00 | 23.5 | 2.2 | 86.7 | 2 | <0.3 |
| KNV/PD.1 | 0.85 | 0.22 | 0.5 | 0.093 | 4.4 | 0.55 | 8.3 | — | 83.8 | 9 | <0.3 |
| KNV/F | 1.68 | 0.41 | 1.0 | 0.186 | 8.8 | 0.63 | 15.0 | — | 75.6 | 3 | 1.1 |
| KNV/F-C* | 1.68 | 0.41 | 2.5 | 0.465 | 22.0 | 1.25 | 1.2 | 1.8 | 79.3 | 1 | 2.0 |
| KNV/F-C | 1.68 | 0.41 | 1.0 | 0.186 | 8.8 | 0.50 | 16.0 | — | 76.5 | 65 | 2.6 |
| KNVF-C | 1.68 | 0.41 | 1.0 | 0.186 | 8.8 | 0.46 | 15.0 | — | 75.5 | 75 | 3.1 |
| KNV-M | 1.73 | 0.41 | 2.5 | 0.465 | 22.0 | 1.17 | 0.4 | 3.6 | 80.2 | <1 | 1.7 |
| KNV/M+ | 1.73 | 0.41 | 2.5 | 0.0 | 25.0 | 0.65 | — | — | 78.2 | <1 | 1.0 |
| KNV/M | 1.73 | 0.41 | 1.0 | 0.186 | 8.8 | 0.50 | 16.0 | — | 76.5 | 11 | 1.5 |
| KNV-M+ | 1.73 | 0.41 | 1.0 | 0.0 | 25.0 | 0.31 | — | — | 76.3 | 6 | 1.0 |
| KNV/M | 1.73 | 0.41 | 1.0 | 0.186 | 8.8 | 0.43 | 15.0 | — | 75.4 | 4 | 1.5 |
| KNV/M | 1.73 | 0.41 | 0.5 | 0.093 | 24.5 | 0.50 | — | 0.1 | 75.6 | 4 | 2.0 |
| KNV/M+ | 1.73 | 0.41 | 0.5 | 0.0 | 25.0 | 0.17 | — | — | 75.7 | 50 | 2.0 |
| CAL-#5 | 0.98 | 0.39 | 1.0 | 0.186 | 8.8 | 0.46 | 20.0 | — | 79.5 | 1 | 1.0 |
| KNV/PD.1+ | 0.85 | 0.22 | 2.5 | 0.0 | 25.0 | 1.00 | 5.6 | 5.2 | 89.3 | <1 | <0.3 |

+No $H_2SO_4$ added (E.M.F. of acid mix 340 M.V.)
*KNV/F-C is KNV/F calcined at 1450° F. to reduce carbon from 0.14% to 0.02%.

TABLE 4
TREATMENT WITH $Fe_2(SO_4)_3$ (WITH AND WITHOUT $H_2SO_4/Ca(OH)_2$ NEUTRALIZATION $Fe_2(SO_4)_3.XH_2O$ containing 72% $Fe_2(SO_4)_3$ was used, it has the same Fe content as $FeSO_4.7H_2O$. In each case, 100 g of spent ART Process Material (KNV) were used: $H_2SO_4$ was added only in the first experiment (KNV/H).

| Sample No. | KNV Used Analysis % V | KNV Used Analysis % Ni | $Fe_2(SO_4)_3$ $XH_2O$ Added (g) | $H_2SO_4$ Added (g) | $H_2O$ Added (g) | Acid Mix pH | Acid Mix EMF MV | $Ca(OH)_2$ Added (g) | Final pH | $H_2O$ Added (g) To Acid Mix | $H_2O$ Added (g) To $Ca(OH)_2$ Mix | Total Wt. of Paste (g) | EPA Leachate (ppm) V | EPA Leachate (ppm) Ni |
|---|---|---|---|---|---|---|---|---|---|---|---|---|---|---|
| KNV/H | 1.34 | 0.36 | 12.0 | 5.0 | 90.0 | 0.5 | 890 | 16.6 | 11.6 | — | — | 223.6 | <1 | 2.4 |
| KNV/PD.1 | 0.85 | 0.22 | 1.0 | — | 40.0 | 2.1 | 670 | 1.26 | 11.4 | 25.0 | — | 167.3 | 6 | 0.5 |
| KNV/PD.1 | 0.85 | 0.22 | 2.0 | — | 40.0 | 1.9 | 690 | 1.63 | 11.3 | 25.4 | 3.2 | 172.2 | 2 | 0.5 |
| KNV/PD.1 | 0.85 | 0.22 | 5.0 | — | 40.0 | 1.6 | 735 | 3.00 | 10.3 | 31.2 | 10.8 | 190.0 | <1 | 0.5 |

TABLE 5

TREATMENT WITH $Fe_2(SO_4)_3$—NO $H_2SO_4/Ca(OH)_2$ NEUTRALIZATION
In each case, 50 g of spent ART Process Material (KNV) was used. Various amounts of $Fe_2(SO_4)_3.XH_2O$ were mixed in and neutralized with $Ca(OH)_2$ to pH $\geq$ 10. No $H_2SO_4$ was added.

| Sample No. | KNV USED Analysis % V | KNV USED Analysis % Ni | $Fe_2(SO_4)_3.XH_2O$ Added g | $H_2O$ Added g | $Ca(OH)_2$ Added g | ADDITIONAL $H_2O$ (g) TO ACID MIX | ADDITIONAL $H_2O$ (g) TO LIME MIX | TOTAL Wt. of Paste (g) | EPA LEACHATE (ppm) V | EPA LEACHATE (ppm) Ni |
|---|---|---|---|---|---|---|---|---|---|---|
| KNV/PD.1 | 0.85 | 0.22 | 2.5 | 22.5 | 1.42 | 9.2 | 1.7 | 87.3 | <1 | <0.3 |
| KNV/PD.1 | 0.85 | 0.22 | 1.0 | 9.0 | 0.69 | 7.3 | — | 83.0 | 2 | <0.3 |
| KNV/PD.1 | 0.85 | 0.22 | 0.5 | 4.5 | 0.61 | 7.4 | — | 83.0 | 8 | <0.3 |
| KNV/M | 1.73 | 0.41 | 2.5 | 22.5 | 1.37 | 1.0 | 3.4 | 80.8 | 7 | 2.5 |
| KNV/M | 1.73 | 0.41 | 1.0 | 24.0 | 0.49 | — | 0.8 | 76.3 | 45 | 2.4 |
| KNV/M | 1.73 | 0.41 | 0.5 | 4.5 | 0.26 | 20.5 | — | 75.8 | 90 | 2.8 |
| CAL-#5 | 0.98 | 0.39 | 2.5 | 22.5 | 1.36 | 1.0 | 7.4 | 84.8 | <1 | 1.5 |
| CAL-#5 | 0.98 | 0.39 | 1.0 | 24.0 | 0.59 | 3.4 | 1.0 | 80.0 | 5 | 1.0 |
| CAL-#5 | 0.98 | 0.39 | 0.5 | 4.5 | 0.31 | 24.5 | — | 79.8 | 20 | 1.0 |
| KNV/F | 1.68 | 0.41 | 0.5 | 4.5 | 0.50 | 20.0 | — | 75.5 | 40 | 1.3 |
| KNV/F-C* | 1.68 | 0.41 | 0.5 | 4.5 | 0.37 | 20.8 | — | 72.2 | 140 | 3.2 |

*KNV/F-C IS KNV/F calcined at 1450° F. to reduce carbon from 0.14 to 0.2%.

TABLE 6

TREATMENT WITH $Al_2(SO_4)_3$ OR WITH $Al_2(SO_4)_3$ + $Fe_2(SO_4)_3/Ca(OH)_2$ NEUTRALIZATION
In each case, 50 g of spent Art Process Material (KNV/P, V-0.85%, Ni-0.22%) were pugged with either a solution of $Al_2(SO_4)_3$ or with a solution containing $Al_2(SO_4)_3$ and $Fe_2(SO_4)_3$ and $Ca(OH)_2$ was pugged in to pH $\geq$ 10. Water was added as needed. No $H_2SO_4$

| $Al_2(SO_4)_3.18H_2O$ Added (g) | $Fe_2(SO_4)_3.XH_2O$ Added (g) | $H_2O$ Added (g) | $Ca(OH)_2$ Added (g) | Additional $H_2O$ (g) To Acid Mix | Additional $H_2O$ (g) To $Ca(OH)_2$ Mix | Total Wt. of Paste (g) | EPA Leachate (ppm) V | EPA Leachate (ppm) Ni |
|---|---|---|---|---|---|---|---|---|
| 5.0 | — | 20.0 | 5.0 | 12.0 | 8.7 | 100.7 | 4 | <0.3 |
| 2.0 | — | 8.0 | 2.4 | 24.4 | 4.0 | 90.8 | 5 | <0.3 |
| 1.0 | — | 4.0 | 1.6 | 27.6 | 0.4 | 84.6 | 10 | <0.3 |
| 4.0 | 0.5 | 20.5 | 3.0 | 10.0 | 7.6 | 95.6 | 1 | <0.3 |
| 4.8 | 0.1 | 20.1 | 2.7 | 11.6 | 7.7 | 97.0 | 2 | <0.3 |

TABLE 7

VARIOUS ALTERNATE TREATMENT REAGENTS
In each case, 10 g CAL #5 were mixed with 1.0 g of the treatment reagent dissolved in 5.0 g $H_2O$ with the addition of further $H_2O$ to make a mixable paste. $Ca(OH)_2$ was added to pH >10 with extra water as required. The resulting pastes were leached by the E.P.A. method.

| Treatment Reagent | g $H_2O$ Added To Acid Mix | g $H_2O$ Added To Lime Mix | $Ca(OH)_2$ Added g | Final pH | Total wt. of paste g | E.P.A. Leachate ppm V | E.P.A. Leachate ppm Ni | Other Metals |
|---|---|---|---|---|---|---|---|---|
| $CuSO_4.5H_2O$ | 0.9 | 1.9 | 0.81 | 12.0 | 19.6 | <1 | 2 | Cu 410 |
| $NiSO_4.6H_2O$ | 1.0 | 1.1 | 0.60 | 10.9 | 18.7 | 8 | 500 | |
| $ZnSO_4.7H_2O$ | 1.2 | 2.1 | 0.82 | 11.8 | 20.1 | 50 | 1 | Zn 570 |
| $SrCl_2.6H_2O$ | 0.6 | 0.5 | 0.60 | 11.7 | 17.7 | 60 | 1 | Sr 860 |
| $SnCl_2.2H_2O$* | 3.1 | — | 0.46 | 10.5 | 19.6 | <1 | 1 | Sn <3 |
| $SnCl_4.5H_2O$ | 2.0 | 1.1 | 0.89 | 11.2 | 20.0 | 2 | 1 | |
| $TiOSO_4.H_2SO_4.8H_2O$** | 1.8 | 1.2 | 0.79 | 12.1 | 19.8 | <1 | 2 | |
| $ZrSO_4.H_2SO_4.3H_2O$ | 2.3 | 1.6 | 0.65 | 11.5 | 20.6 | <1 | 3 | |
| $MnSO_4.H_2O$ | 3.0 | 0.8 | 0.54 | 11.8 | 20.3 | 23 | 2 | Mn 700 |

*Some remained undissolved after stirring 4 hours with $H_2O$.
**Small amount remained undissolved after stirring 4 hours with $H_2O$.

We claim:

1. A process for reducing the leachability of vanadium in an acidic material intended for disposal as landfill, wherein said material is a solid particulate material previously used in the selective vaporization or catalytic cracking of hydrocarbon feedstock comprising vanadium as a contaminant which comprises (a) contacting said material in the presence of water with an effective amount of at least one water soluble salt of polyvalent metal, said salt being one that is capable of dissolving in water to form an acidic solution and which is capable of forming a hydroxide, oxide or hydrated oxide which is substantially insoluble at pH 5, polyvalent metal ions in said salt having a valence of +3 or higher or being ions of a divalent metal that is oxidizable to a valence of +3 or higher, the cation of said salt being selected form the group consisting of $Fe^{+2}$, $Fe^{+3}$, $Sn^{+2}$, $Sn^{+4}$, $Ti^{+4}$, $Zr^{+4}$, $Al^{+3}$, trivalent and quadrivalent rare earth metals, and mixtures thereof, and the anion in said salt being selected from the group consisting of sulfate, nitrate, and chloride, and (b) increasing the pH of the resulting mixture to a value of at least 7 by addition of a base of calcium, magnesium or sodium, to insoluble said vanadium and reduce the water leachability of vanadium in said acidic material.

2. The process of claim 1 wherein said polyvalent metal salt is added in amount sufficient to provide at least one equivalent of polyvalent metal ions per equivalent of leachable vanadium.

3. The process of claim 1 wherein said material intended for disposal also contains nickel and the leachability of nickel is also reduced.

4. The process of claim 1 wherein said salt is a sulfate.

5. A process for discarding acidic solid or liquid material containing leachable or solubilized vanadium said material containing solid particulate material previously used in the selective vaporization or catalytic cracking of hydrocarbon feedstock comprising vanadium as a contaminant which comprises (a) mixing said material, prior to discard, in the presence of water with an effective amount of at least one added salt of a polyvalent metal, said salt being one that is capable of dissolving in water to form an acidic solution and which is capable of forming an hydroxide, oxide or hydrated oxide which is substantially insoluble at pH 5, said polyvalent metal having a valence of +3 or higher or being a divalent metal that is oxidizable to a value of +3 or higher, the cation of said salt being selected from the group consisting of $Fe^{+2}$ $Fe^{+3}$, $Sn^{+2}$, $Sn^{+4}$, $Ti^{+4}$, $Zr^{+4}$, $Al^{+3}$, trivalent and quadrivalent rare earth metals and mixtures thereof, the anion of said salt being selected from the group consisting of sulfate, nitrate and chloride, and (b) adding a base of calcium, magnesium or sodium to the mixture in amount sufficient to increase pH to a value of at least 7 to precipitate said cation and insolubilize and vanadium, and reduce the leachability of vanadium in said material.

6. The process of claim 5 wherein the cation of said salt is selected from the group consisting of ferrous, ferric, aluminum, mixtures and combinations thereof.

7. The process of claim 6 wherein the anion of said salt is chloride.

8. The process of claim 6 wherein said anion is sulfate.

9. The process of claim 8 wherein said base comprises calcium and sufficient calcium ions are introduced to precipitate substantially all of the sulfate ions.

10. A process for reducing the leachability of vanadium in a solid acidic material to be discarded, wherein said material is a solid particulate material previously used in the selective vaporization or catalytic cracking of hydrocarbon feedstock comprising vanadium as a contaminant, said vanadium being present at least in part as $V^{+5}$, which comprises mixing said material in the presence of water with ferrous sulfate and sulfuric acid using at least one equivalent of ferrous sulfate per equivalent of soluble vanadium and thereafter adding a basic calcium compound in amount of at least sufficient to increase the pH to a value of at least 7 and—has been inserted precipitate sulfate ions as calcium sulfate and also to precipitate iron cations and insolubilize said vanadium, and reduce the leachability of vanadium in said material.

11. The process of claim 10 wherein the leachability of vanadium is reduced to a value below 10 ppm.

12. A process for treating solid acidic particles that are contaminated with vanadium that is leachable and also are contaminated with other metals including at least nickel, wherein said particles were previously used in the selective vaporization or catalytic cracking of hydrocarbon feedstock comprising vanadium and nickel at contaminants, which process comprises mixing said particles, in the presence of water, with a salt selected from the group consisting of ferrous sulfate, ferric sulfate, aluminum sulfate and mixtures and compounds thereof, the amount of said salt being at least sufficient to provide one equivalent per equivalent of soluble vanadium, adding a basic calcium compound in amount at least sufficient to increase the pH to a value of at least 8 and to precipitate substantially all sulfate ions and disposing said particles now containing insolubilized vanadium and nickel in substantially nonleachable condition as landfill.

13. The proces of claim 12 wherein said basic calcium compound is lime.

14. The process of claim 12 wherein the amount of water added to said particles is limited so that the particles after addition of said salt and after addition of said calcium compound is a solid or semi-solid mass.

15. The process of claim 12 wherein the pH of said particles prior to addition of said salt is below 6.

16. The process of claim 12 wherein the weight of the particles after addition of said calcium compound is about 1½ times the weight of the original particles.

17. The process of claim 12 wherein said particles also contain nickel leachable by water and the leachability of nickel is also reduced.

18. The process of claim 12 wherein said metal salt is added in amount such that the cation thereof is present in amount of one equivalent per equivalent of leachable vanadium in said particles.

19. The process of claim 12 wherein said material comprises solid particles of contact material previously used to remove metallic and carbonaceous contaminants in hydrocarbon feedstock by selective vaporization.

20. The process of claim 12 wherein said material comprises solid fluidizable particles of contact material obtained by calcining microspheres containing kaolin clay, said microspheres having previously been used to remove metal contaminants in hydrocarbon feedstock by selective vaporization.

21. The process of claim 12 wherein said material comprises particles of a cracking catalyst originally containing a zeolitic molecular sieve and an inorganic oxide matrix and previously used to crack petroleum feedstock containing vanadium and nickel.

22. A process for treating solid acidic particulate alumina-silica material containing leachable vanadium to render such material suitable for discard, wherein said material was previously used in the selective vaporization or catalytic cracking of hydrocarbon feedstock comprising vanadium as a contaminant which comprises mixing said material in the presence of water with at least one added water-soluble sulfate salt of a metal selected from the group consisting of iron, aluminum, mixtures and combinations thereof, sufficient of said salt or salts being added to provide at least one equivalent of metal per equivalent of leachable vanadium, and to produce an acidic mixture, and adding lime or calcium carbonate followed by lime in amount sufficient to precipitate the metal and sulfate ions and produce a mixture having a pH of at least 7, wherein said vanadium is insolubilized and said material is rendered suitable for discard.

23. The process of claim 22 wherein said material also includes nickel.

24. The process of claim 22 wherein the water present is so limited that after addition of said basic calcium compound, the mixture is in the form of a solid or semi-solid mass.

25. The process of claim 24 wherein the weight of said solid or said semi-solid mass is about 1½ times the original weight of said material.

26. The process of claim 24 wherein the leachability of vanadium is reduced to a value below 10 ppm.

27. The process of claim 24 wherein the leachability of vanadium is reduced to a value below 3 ppm.

28. The process of claim 24 wherein the cation of said salt is iron.

29. The process of claim 24 wherein the cation of said salt is aluminum.

30. A process for disposing of particulate acidic silica-alumina material containing vanadium, nickel and other heavy metals as contaminants said material resulting from the removal of said contaminants from a hydrocarbon material by treatment with a particulate silica-alumina material, said vanadium in said particulate material to be disposed of being leachable in excess of 10 ppm with water at a pH about 5, which process comprises adding to said particulate material to be disposed of, in the presence of water, at least one equivalent per equivalent of leachable vanadium of a salt selected from the group consisting of sulfate salts of iron and aluminum, mixtures and compounds thereof, and thereafter adding lime or calcium carbonate followed by lime until the pH of the mixture is at a value above 8 to insolubilize said vanadium, and wherein the leachable vanadium of said mixture is below 10 ppm.

* * * * *

UNITED STATES PATENT AND TRADEMARK OFFICE
CERTIFICATE OF CORRECTION

PATENT NO. : 4,668,124
DATED : May 26, 1987
INVENTOR(S) : F. Pitts, et al

It is certified that error appears in the above—identified patent and that said Letters Patent is hereby corrected as shown below:

In the claims:

Column 16,
    line 65, change [insoluble] to --insolubilize--;

Column 17, Claim 5, line 28, delete [said cation and insolubilize and], replace with --said cation and insolubilize said--

Column 17, Claim 8, line 36, change [claim 6] to --claim 7--
Column 17, Claim 10, line 50, delete [of];
        line 51, after "and" delete [-has been];
        line 52, delete [inserted];

Column 17, Claim 12, line 64, change [at] to --as--.

Signed and Sealed this

Fourth Day of October, 1988

*Attest:*

DONALD J. QUIGG

*Attesting Officer*      *Commissioner of Patents and Trademarks*